Patented May 5, 1931

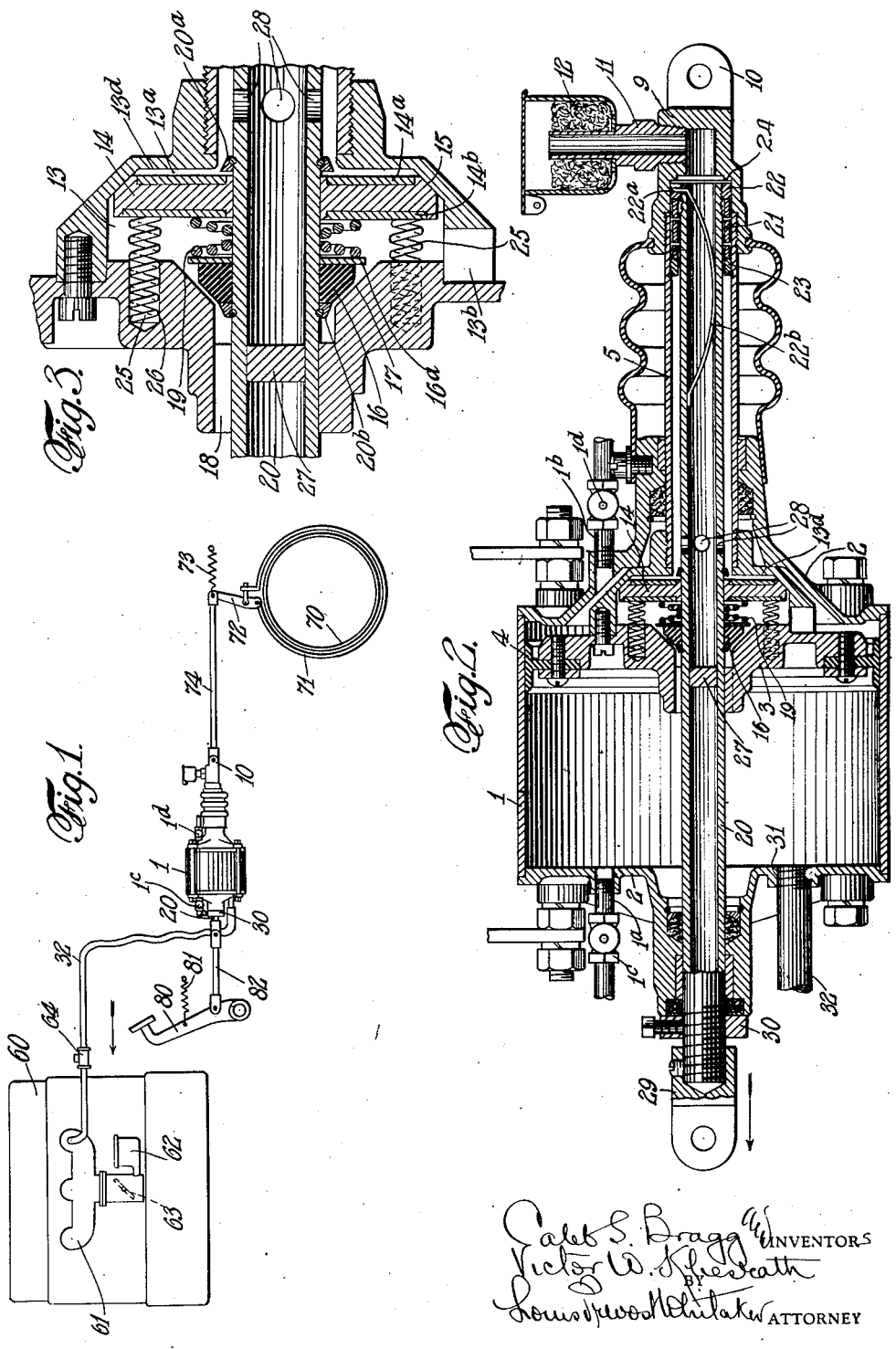

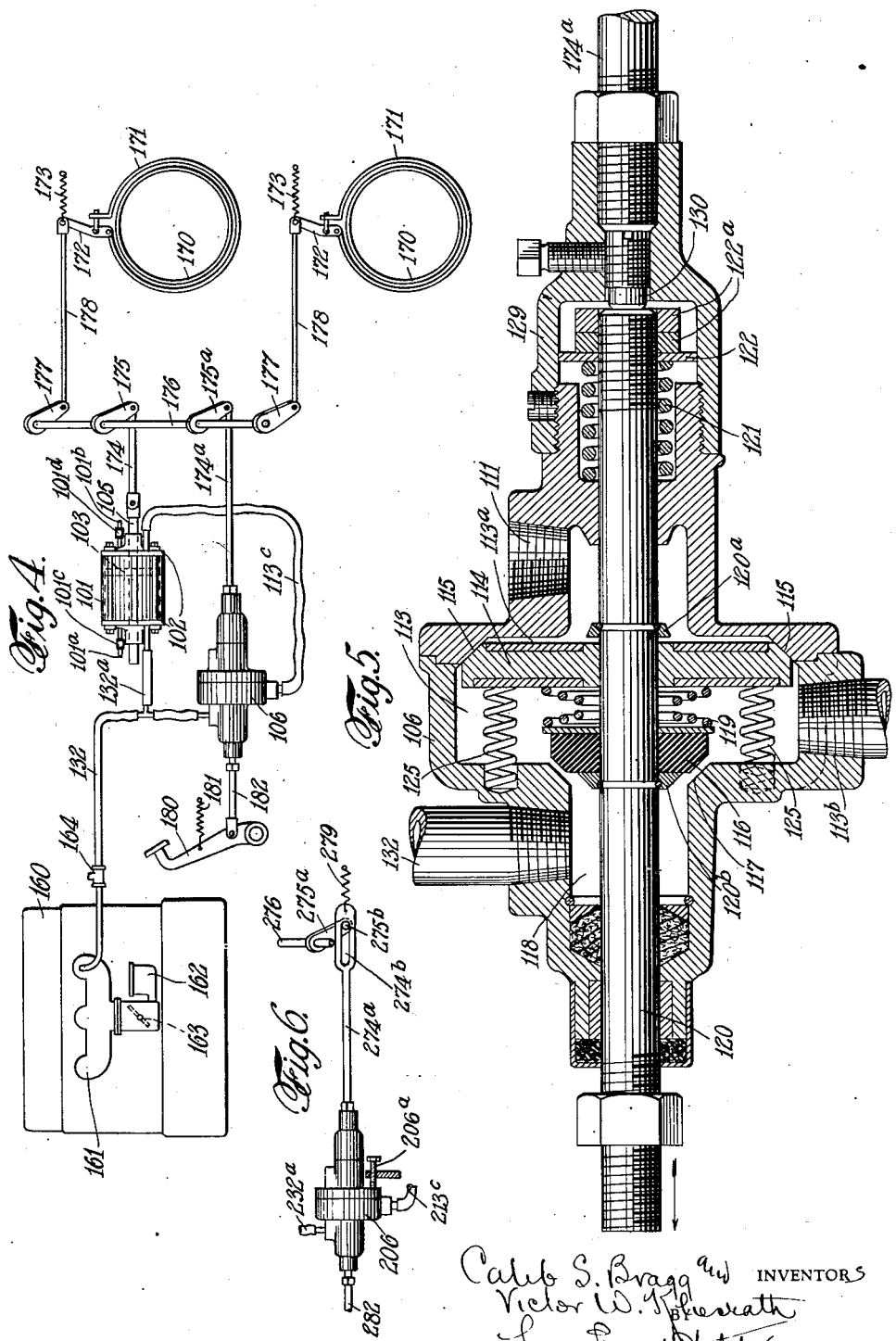

1,803,314

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed June 17, 1927, Serial No. 199,477. Renewed October 14, 1929.

Our invention consists in the novel features hereinafter described, reference being had to the accompanying drawings which show two embodiments of the invention selected by us for purposes of illustration, and the said invention is fully disclosed in the following description and claims.

Our invention is an improvement in power actuators for use in connection with automotive vehicles and especially for operating the brake mechanism thereof. The object of our invention is to enable the operator to determine by the increased resistance to the operator operated part connected with the valve mechanism of the actuator, as for example by the increased pressure against his foot where a pedal lever is employed to actuate the valve mechanism of the actuator, how much pressure the piston of the actuator is exerting on the brakes or other part to be actuated.

According to our present invention a valve operatively connected with the operator operated part and controlling the operation of the actuator to effect the application of the brakes, or the operation of the device to be operated, is subjected normally on one face to a higher fluid pressure in a direction tending to open the valve, and on the other face to a lower fluid pressure, and is made of such area as to give the desired increasing resistance to the foot pedal or other operator operated device, due to said valve being provided with a spring or springs on the low pressure side, tending to seat it and of sufficient tension to overcome the atmospheric or other higher pressure on the opposite face of the valve and normally keep the valve seated. The source of higher pressure may be the atmosphere or a superatmospheric fluid pressure, and the source of lower pressure may be either subatmospheric or atmospheric. Where the valve is located in the piston of the actuator, this spring, or springs, will be interposed between the valve and a part of the piston. Where the valve is located exterior to the piston in a valve casing connected with a part to be operated, such spring or springs will be located between the valve and a portion of the valve casing. The construction of the improved valve mechanism is such that when the operator operated part is moved in a direction to open the said valve, it will only be necessary to overcome a predetermined initial resistance, to wit, the excess of the spring pressure on one side of the valve above the air pressure on the opposite face, but as soon as the valve is opened the fluid pressures on opposite faces of the valve will become partially equalized, so that a portion of the counterbalanced spring pressure will be exerted against the operator, and the amount of pressure so exerted will increase as the fluid pressures on opposite faces of the valve approach more and more nearly to equilibrium. The operator will thus be enabled to gauge the amount of power the power actuator is exerting by the increasing resistance of the manually operator operated part. Where the operator operated part is connected with the brake mechanism or other part to be operated by means permitting lost motion to permit the physical force of the operator to be applied to the brakes, in addition to that of the actuator, or in case of failure of power, there is no loss of power, as the physical force exerted by the operator to overcome the reaction of the said spring or springs will be transmitted therethrough to assist in moving the piston in a desired direction of its effective stroke. Our invention thus permits the use of a smaller cylinder than is possible where the re-actionary feature is obtained by linkages which transmit a portion of the power exerted by the piston to the operator operated part, which reduces the cost and weight of the device, and furthermore where the power actuator is operated by suction of the intake manifold in an internal combustion engine, smaller quantities of air are admitted into the intake manifold for each application of the brakes, the danger of stalling the engine if idling or interfering with its operation is greatly reduced. It is to be further noted that after the brakes have been applied to the desired extent, the operator permits the said high pressure valve to close, thereby transferring the load of the springs from the operator operated part to the valve seat, and may hold the brakes as applied while descending along grades, without physical effort or fatigue.

Referring to the accompanying drawings,

Fig. 1 is a diagrammatic view illustrating an installation in an automotive vehicle of an actuator embodying our invention, deriving its suction from the intake manifold of the engine and arranged to apply the brake mechanism.

Fig. 2 is an enlarged sectional view of the actuator embodying our invention.

Fig. 3 is a still further enlarged sectional view of the valve mechanism of the actuator.

Fig. 4 is a diagrammatic view similar to Fig. 1, showing our invention embodied in valve mechanism for the actuator located outside of the actuator cylinder in linkage between the operator operated part and the brake mechanism.

Fig. 5 is a detail sectional view of the exterior valve mechanism.

Fig. 6 is a detail view of a portion of Fig. 4 showing a slight modification.

In Figs. 1, 2 and 3, we have shown an embodiment of the invention in which the actuator is provided with valve mechanism located in the piston and constructed to normally maintain the piston submerged in vacuum when the piston is in its retracted position. The actuator comprises in this instance the cylinder, 1, closed at both ends by heads, 2, 2, and provided with a piston, 3, having the usual gasket, 4. The piston is provided with a hollow piston rod, 5, at the outer end of which is a cap, 9, provided with a perforated ear, 10, for connecting the piston to the brake mechanism, and the cap is conveniently provided with an air inlet indicated at 11, and preferably provided with a dust collecting receptacle, 12, through which the atmospheric air is drawn. The piston hub is provided with a valve chamber, indicated at 13, of relatively large diameter, to accommodate what is in this instance the air inlet valve, 14, adapted to engage a seat, 15, adjacent to one end of the valve chamber, a portion of which chamber, indicated at 13ª, on the rear face of the valve communicates at all times with the atmosphere, as hereinafter described. The valve, 14, may be formed of any suitable material, or of molded cork or rubber, suitably reinforced as by metallic plates or rings, 14ª, 14ᵇ, if desired. The valve, 14, has a central aperture which engages with a sealing fit, a valve actuating sleeve, 20, extending through a stuffing box in the forward head of the cylinder, and through the valve chamber, 13, and preferably through the hollow piston rod 5, as shown. The sleeve, 20, is provided in rear of the valve, 14, with a collar, 20ª, for engaging the valve when the valve sleeve is moved in the direction of the arrow in Fig. 2, to open the valve, 14. The forward face of the valve, 14, which as hereinafter described is normally exposed to suction, or partial vacuum, when the piston is in its retracted position, is engaged by what we term the resistance spring, or springs. These may be of any desired number and we have shown them arranged in a circle around the axis of the piston and interposed between the valve, 14, and a part of the piston itself. In this instance we have shown in Figs. 2 and 3, two of these resistance springs, indicated at 25, located in recesses, 26, in the piston hub, and engaging the valve, 14, adjacent to its outer edge. The valve seat, 15, forms a stop to limit the closing movement of the valve under the influence of the resistance springs. The valve chamber is also provided with a suction valve indicated at 16, engaging a valve seat, 17, which communicates through a passage, 18, in the piston hub with the interior of the cylinder forward of the piston. The suction valve may be made of any suitable material, but is preferably made of molded cork or rubber, having a sealing fit around the valve sleeve, 20, and normally engaged by a collar, 20ᵇ, on the valve sleeve, located on the forward side of the suction valve and normally holding it in open position when the piston is in retracted position, as hereinafter described. We provide yielding means for pressing the suction valve in a direction toward its seat, consisting in this instance of a spring, 19, engaging a metal plate, 16ª, on the rear face of the valve, 16, and the forward face of the inlet valve, 14, as shown, for the convenience of manufacture, in which case the reaction of this spring, 19, exerts a forward pressure on the air inlet valve, although the spring, 19, may operate between the collar on the sleeve, 20, and the suction valve without effecting the inlet valve, if desired. The spring pressure exerted against the forward face of the air inlet valve, 14, by the springs, 25, (and any other spring, or springs, tending to seat or close the valve) will be substantially equal to or very slightly in excess of the actual air pressure on the rear face of the valve, 14, so that the spring pressure and air pressure counterbalance each other substantially, the spring pressure being just sufficiently in excess of the air pressure to normally hold the air inlet valve, 14, tightly seated. The atmospheric pressure to which the valve, 14, is exposed, when seated, will of course be transmitted to the piston through the resistance springs, 25, and might tend to move the piston forward, on account of the large area of the valve, 14, unless this normal atmospheric pressure is counterbalanced. We conveniently provide the valve casing, which is also connected with the piston, with an annular face, 13ᵈ, immediately in rear of the face of the valve, 14, and of substantially the same area except for the difference in diameters of the hollow piston rod and the valve actuating sleeve, so that the air which enters through the hollow piston rod from the atmosphere exerts a rearward pressure on the face, 13ᵈ, which is substantially equal to the forward pressure which it exerts on the valve, 14, and as the valve casing is connected with the piston, these pressures substantially counterbalance each other so that the piston will remain in its retracted position until the valve mechanism is operated. The slight difference in area between the rear face of the valve, 14, and the annular reaction face, 13ᵈ, of the valve chamber, is not sufficient to overcome the frictional resistance of the piston. It is obvious that the pressure of atmospheric air on the valve when closed could be counterbalanced in other ways, as by making the piston rod and valve rod of substantially the same diameter as the valve, 14, for example, which would increase the size, weight and cost of the apparatus; or the air pressure on the valve, 14, could be counterbalanced by an extra heavy spring, 73. By providing the valve casing with the annular reaction face, 13ᵈ, the construction is made more practical from a manufacturing standpoint, the cost, weight and size is reduced, and the necessity for an especially strong retracting spring is obviated. Such a spring would necessitate the use of a larger cylinder to obtain the desired power of the actuator piston, and would also reduce the amount of force which the operator could exert on the brake mechanism in the manner hereinafter described. The valve actuating sleeve, 20, is provided with retracting means which normally maintains the suction valve, 16, in open position. In this instance we have shown a retracting spring, 21, interposed between a collar, 22, screwed on the end of the sleeve, 20, and a collar, 23, fixed to the interior of the hollow piston rod, 5, which normally holds the sleeve, 20, in its rearmost position with respect to the piston and piston rod and against a shoulder, 24, formed in this instance on the cap, 9. The collar, 22, may be locked in position by means of a pin, 22ᵃ, having a spring portion, 22ᵇ, extending within the sleeve, 20, to prevent the accidental displacement of the pin. The hollow sleeve, 20, is provided with an interior plug, or closure, 27, forward of the valve chamber, and with air inlet apertures, 28, in rear of said chamber, thus establishing communication between the portion, 13ᵃ, of the valve chamber in rear of the large air inlet valve, 14, and the atmosphere through the rear portion of the hollow valve actuating sleeve, 20. The forward end of the valve actuating sleeve is provided with a connection, 29, having a perforated ear for connecting it with the operator operated part, and the valve actuating sleeve may also be provided, as shown, with an adjustable collar, 30, to engage the hub of the cylinder head when the piston is in the retracted position, to limit the opening of the suction valve, 16. The front head of the cylinder is also provided with a suction aperture, indicated at 31, by means of which a suction pipe, 32, leading to a source of suction, as the intake manifold of an internal combustion engine, may be connected. The actuator just described is shown diagrammatically in Fig. 1, installed in connection with brake mechanism for an automotive vehicle propelled by an internal combustion engine. In this figure, 60 represents the internal combustion engine for driving the vehicle provided with an intake manifold, 61, a carburetor, 62, and the usual throttle valve, 63. The intake manifold is connected by means of the suction pipe, 32, with the portion of the cylinder, 1, forward of the piston therein, and said pipe may be, if desired, provided with a check valve, indicated at 64. The piston rod, 5, is shown connected by a link, 74, with the brake mechanism of the vehicle, which may be of any desired character and applied to any number of wheels on the vehicle, but is here represented diagrammatically by a brake drum, 70, brake band, 71, brake lever, 72, and retracting spring, 73. 80 represents the operator operated part, in this instance a pivoted foot lever, provided with the usual retracting spring, 81, and connected by link, 82, with the valve actuating sleeve, 20. We also prefer to connect the lever, 80, with the piston of the actuator by means providing a certain amount of lost motion. This may be accomplished in a number of ways, and is conveniently accomplished in this case by employing as the retracting spring, 21, a flat helical spring, the coils of which are adapted to be brought into contact by a short movement of the valve actuating sleeve, 20, in the direction of the arrow in Fig. 2, sufficient to effect the closing of the suction valve, 16, and the opening of the air inlet valve, 14, after which any further pressure on the foot lever, 80, will be transmitted to the piston and to the brake mechanism in addition to the power of the actuator if the latter is operated, and to enable the brakes to be applied by the physical force of the operator alone in case of failure of power.

When the parts are in normal or released position and the engine is running, the suction of the manifold through suction pipe. 32, will maintain the cylinder on both sides of the piston in a state of rarification and the piston submerged in vacuum. To apply the brakes the operator moves the foot lever, 80, forward in the direction of the arrow, which will effect a movement of the valve actuating sleeve in the same direction, permitting the suction valve, 16, to close under the action of spring, 19, and thereafter bringing the collar, 20ª, into contact with the air inlet valve, 14, and opening said valve. As the atmosphere is exerting a pressure on the rear face of the inlet valve, it is obvious that the only resistance to be overcome to open the air inlet valve, 14, and apply the brakes from the released position is the resistance of the retracting springs, in this instance the springs, 21 and 81, and the slight excess of the pressure of the resistance springs, 25, above the atmospheric pressure on the rear face of the valve, 14. The resistance springs, 25, therefore, do not resist the opening movement of the valve, 14, to any appreciable extent. As soon as the valve, 14, opens, however, the atmospheric air is admitted into the valve chamber, 13, and therefrom through a passage indicated at 13ᵇ, to the cylinder in rear of the piston, to effect the movement of the piston. This immediately begins to effect an equalization of pressures on opposite faces of the air inlet valve, 14, and as the pressure forward of the valve, 14, builds up, a corresponding amount of the force of the resistance springs, 25, is transferred through the valve, 14, the collar, 20ª, and the valve actuating sleeve to the foot of the operator, requiring him to exert more and more strength to keep the valve, 14, unseated, as the pressure builds up in the cylinder in rear of the piston and applies the brakes. The greater the force exerted upon the braking surfaces, the greater pressure is built up in the cylinder in rear of the piston to effect that pressure, and the greater the force of the operator's foot required to keep the valve, 14, open to obtain that pressure.

As soon, however, as the forward movement of the operator's foot ceases, the piston will overtake the valve sleeve, permitting the air inlet valve, 14, to close, without opening the suction valve, 16, and thus holding the brakes applied, but as soon as the valve, 14, closes, the pressure of the resistance springs will be taken by the valve seat, and the operator's foot is thus relieved from the necessity of maintaining any pressure on the foot lever beyond that sufficient to overcome the retracting spring, or springs, as 21 and 81, and the operator is thus relieved from the fatigue of keeping his foot on the pedal with pressure sufficient to overcome some or all of the resistance of the springs, 25, in prolonged or continued braking. The brakes, may, therefore, be held applied for any length of time without physical effort, and the tension of the retracting spring, or springs, as 21 and 81, may be as light as desired. However, when the operator wishes to effect a further pressure on the braking surfaces, it will be necessary for him to exert a greater physical effort to compress the resistance spring, or springs, and again effect the opening of the valve, 14, and the pressure of the resistance springs which he must overcome will become maximum when the pressure in the cylinder in rear of the piston is equal to atmospheric pressure.

To release the brakes it is only necessary for the operator to remove his foot from or release the brake pedal, which permits the suction valve to open and equalize the pressures within the cylinder on opposite sides of the piston, the air previously admitted to apply the brakes being withdrawn from both ends of the cylinder through the suction pipe, 32.

It will be noted that according to our invention all the physical force of the operator, which acts to compress either the retracting spring or springs is applied to the piston in a direction of the movement of its effective stroke to apply the brakes, hence the reaction of both spring mechanism tends to move the piston forward and consequently there is no loss of the physical force of the operator and the full power of the piston is also applied to the brakes instead of having any portion of it diverted to react upon the foot of the operator, while at the same time the operator is informed by the increase in the force required of him to keep the valve, 14, open, or to open it when the brakes are partly applied to impart greater pressure to the brakes, as to the degree of braking force which he is exerting. This is desirable in the use of power actuators in which the power required to operate the valve mechanism is so comparatively slight that the operator cannot ordinarily determine by the sense of of feeling the degree to which the brakes are applied, and must judge the same by the conduct of the vehicle itself. By our invention he is enabled to determine the extent of application of the brakes by the sense of feeling in the same manner as in the application of the ordinary hand or foot operated brakes, while in holding the brakes applied he is relieved entirely of this increased resistance, by the seating of the valve, 14.

It will also be understood that after the brakes are fully applied to the extent of the power of the actuator, the operator may by further depressing the foot lever so as to take up the lost motion between the valve actuating sleeve, 20, and the piston, apply his physical force to the brake mechanism in addition to that of the actuator, and in like manner, should the suction fail for any reason, the operator may by taking up this lost motion, and at the same time opening the valve to vent the cylinder, positively move the piston forward and apply the brakes by his physical force alone, and in either case the physical force of the operator in compressing either the retracting springs or the resistance springs will react upon the piston in a direction to effect its forward movement, so that his full physical force will be applied to the brakes and none of it is lost in the compression of the springs.

It is to be noted that by means of our invention a cylinder of smaller size and of less weight may be employed to do the same work with less cost of manufacture and more convenience in installation, and correspondingly smaller quantities of air are withdrawn into the intake manifold for each application of the brakes.

Our invention is also applicable to a power actuator provided with an exterior valve mechanism located in the connections between the operator operated part and the brake mechanism, and we have illustrated such a construction in Figs. 4 and 5, in which the corresponding parts are given the same reference numerals with the addition of 100. In this instance the actuator comprises a cylinder, 101, closed at each end by heads, 102, and provided with a piston, 103, having its piston rod, 105, connected by a link, 174, in this instance to an arm, 175, on a rock shaft, 176, provided with arms, 177, connected by links, 178, with the operating levers, 172, of the brake mechanisms, two of which are diagrammatically illustrated in Fig. 4 in the same manner as in Fig. 1, and need not be again described. The valve mechanism shown in detail in Fig. 5 comprises a valve casing, 106, movable longitudinally with respect to the cylinder and movable with the piston, 103, by reason of the fact that it is connected by a link, 174ª, to an arm, 175ª, on the rock shaft, 176. The valve casing is provided with a valve chamber, 113, having a valve seat, or valve stop, 115, adjacent to its rear end, engaged by the air inlet valve, 114, leaving a portion, 113ª, of the valve chamber in rear of said valve communicating with an air inlet passage, 11, in the valve casing. In this case, as the valve casing is entirely surrounded by atmospheric air, the pressure of the atmosphere on the valve, 114, is counterbalanced by the pressure in the opposite direction on the exterior of the valve casing, so that there is no tendency for the valve casing to move under the action of atmospheric pressure when the valve, 114, is in closed position. The valve, 114, is provided with the resistance springs, 125, two of which are shown and which are interposed between the valve, 114, and the forward wall of the valve chamber in the valve casing. 120 represents the valve actuating part, which is in this instance a rod extending through a stuffing box at the forward end of the valve casing, and connected by link, 182, with the foot lever, 180, having a retracting spring, 181. 116 represents the suction valve, both of said valves being constructed and mounted on the valve actuating part, 120, in the same manner as previously described, and being operated by the collars, 120ª and 120ᵇ, respectively, spring, 119, being interposed between the valves. The valve casing is provided with a suction chamber, 118, forward of the suction valve seat, 117, which chamber is connected by the suction pipe, 132, leading to the intake manifold, 161, of the engine, 160, and said suction pipe, 132, is connected by a pipe, 132ª, with the cylinder of the actuator forward of the piston. The valve chamber, 113, is provided with an opening, 113ᵇ, connected by a pipe, 113ᶜ, with the cylinder, 101, in rear of the piston. In this instance the valve actuating rod, 120, is provided with a retracting spring, 121, located in a recess in the end of the valve casing, engaging a washer, or collar, 122, on the rod, 120, secured in position by set nuts, 122ª, and tending to hold the suction valve normally in open position, and the degree of opening of the suction valve may be determined by an adjustable stop, 130, formed in this instance on the end of an adjusting screw threaded into a hole in a cap, or fitting, 129, secured to the valve casing, and to which the connecting link rod, 174ª, is adjustably secured.

In the form of our invention shown in Figs. 4 and 5, the piston of the actuator is also normally submerged in vacuum when in retracted or off positions. The cylinder forward of the piston is at all times connected with the suction pipe, and when the parts are in the off or retracted position, the suction valve, 116, is in open position, as shown in Fig. 5, thus placing the cylinder in rear of the piston also in communication with the suction pipe through the pipe, 113ᶜ, and the valve chamber, 113, and the aperture formed by the normally opened suction valve. It will be seen that the resistance spring, or springs, 125, bear upon the air inlet valve, 114, in a direction to close it, and as the valve chamber, 113, is in communication with the suction pipe, the valve, 114, is subjected to the atmospheric pressure on its outer face sufficient to almost counterbalance the pressure of the resistance springs, 125, and the spring 119. The operation is exactly the same as that previously described with reference to Figs. 1, 2 and 3, and need not be repeated. In this construction also, when the suction valve is closed and the air inlet valve, 114, is open, pressure will build up, by the entrance of atmospheric air, in the valve chamber, 113, and in the cylinder, 101, in rear of the piston, and as the differential of fluid pressures decreases, the pressure of the resistance springs, 125, will be sustained by the foot of the operator to a gradually increasing extent until the brakes are fully applied, or until the valve, 114, will be seated by the valve casing overtaking the valve and hold the brakes applied at the same time relieving the operator's foot from the pressure of the resistance springs so long as the brakes are held applied, but requiring the operator to assume this pressure again if it is desired to exert a greater pressure on the brakes, either through the actuator or by taking up the lost motion between the valve actuating rod and the valve casing, which occurs when the spring, 121, is compressed, so as to bring the collar, or washer, 122, against the end of the valve casing when the operator is enabled to add his physical force to that of the actuator. It will be seen that in this construction also, the compression of all the springs, which have to be overcome by the operator in moving the valve mechanism in a direction to effect an application of the brakes, or to effect the application of the brakes by physical force, reacts in a direction tending to apply the brakes, so that the full force of the piston and also the full physical force of the operator, when exerted, is available to apply the brakes, and there is no loss of power.

It is also to be understood that while we have shown in this application embodiments of our invention in which the actuator piston is submerged in vacuum when in retracted position, the invention is equally applicable in connection with actuator cylinders in which the piston is submerged in atmospheric air, when in retracted position. The specific form of valve mechanism for use in connection with actuators in which the piston is submerged in atmospheric pressure, forms the subject matter of another application (filed Aug. 4, 1927, Serial No. 210,512), in which it is specifically claimed. While the embodiments of our invention herein shown and described are in connection with power actuators in which the piston is single acting, it is obvious that our invention is equally applicable to power actuators in which the piston is double acting, in which case either one or both of the air inlet valves may be constructed and arranged in accordance with the valves, 14 and 114, shown and described herein.

Where the valve mechanism is located in a valve casing exterior to the piston and cylinder of the actuator, it is not absolutely necessary that the valve casing should be movable longitudinally with the piston, or brake mechanisms, actuated thereby, although this is desirable where the construction, as previously described, provides for the taking up of lost motion between the valve actuating part and the valve casing, to enable the physical force of the operator to be applied to the brake mechanisms.

In Fig. 6, we have shown a modified construction in which the valve casing, here indicated at 206, is connected by a link rod, rod, 274ᵃ, provided with a slot, 274ᵇ, engaging a stud, 275ᵇ, on the arm, 275ᵃ, connected with the brake operating rock shaft, 276, to which the piston of the actuator is connected. The spring, 279, is connected with the valve casing, being in this instance secured to the link rod, 274ᵃ, and to a stationary part connected with the vehicle, said spring having sufficient strength to hold the valve casing stationary against a stop, 206ᵃ, also secured to the vehicle, when the valve actuating part is moved in the direction indicated by the arrow in Fig. 5, notwithstanding the resistance offered by the resistance springs and retracting springs of the valve mechanism previously described. This construction enables the operator to apply the brakes by merely depressing the foot pedal sufficiently to open the atmospheric valve and to experience the resistance of the resistance springs, as before described, as the air is admitted to the actuator cylinder in rear of the piston. As the brakes are applied by the actuator, the stud, 275ᵇ, will move in the slot, 274ᵇ, while the valve casing remains stationary, being held against the stop by the spring, 279. The operator, however, may add his physical strength to the power of the piston, or to apply the brakes in case of failure of power, by depressing the foot pedal far enough to take up the lost motion between the valve actuating part and the valve casing, in the manner previously described with reference to Figs. 4 and 5, and by exerting sufficient pressure on the pedal to overcome the tension of the additional spring, 279, in which case the valve casing itself will move bodily in the direction of the arrow, carrying with it the link rod, 274ᵃ, and as soon as the rear end of the slot, 274ᵇ, engages the stud, 275ᵇ, the physical force of the operator will be directly applied to the brake mechanism. It will be obvious that the valve mechanism herein described may be connected with a plurality of cylinders, located on the same or different vehicles, (as a tractor or trailer, for example) so as to enable the operator to determine, by the resistance to the operator operated part, the power which is being applied to the various brake mechanisms. For example, in the form of the valve mechanism illustrated in Figs. 1, 2 and 3, it is obvious that the opposite ends of the cylinder, 1, may be connected with the corresponding ends of another cylinder, or cylinders, in the manner illustrated in our former application for Letters Patent of the United States filed May 19, 1925, and given Serial No. 31,281, and in the drawings we have shown the cylinder, 1, provided on opposite sides of the piston with pipe connections, indicated at 1ᵃ and 1ᵇ, for connection with the opposite ends of a cylinder, or cylinders, of valveless actuators consisting merely of a cylinder and piston, the said pipes being shown provided with cocks, 1ᶜ and 1ᵈ, by which they may be closed if no additional actuators are to be connected therewith. In like manner, the cylinder, 101, of the valveless actuator, shown in Fig. 4, is shown provided at its opposite ends with pipes, 101ᵃ, 101ᵇ, and cocks, 101ᶜ and 101ᵈ, to enable it to be connected with another or other valveless actuators, so that they may all be controlled by the exterior valve mechanism, if desired. The same result could be obtained by means of branch pipes extending from the pipes, 132 and 113ᶜ, to the opposite ends of the auxiliary cylinder to be controlled by the valve mechanism. It is obvious that while we have shown our invention applied to an actuator operated by atmospheric air, as higher pressure fluid, working against partial vacuum, the operation would be exactly the same in the case of an actuator operated by a higher pressure fluid at a pressure above atmospheric, connected to the hollow piston rod, 5, Figs. 1, 2 and 3 or to the air inlet port, 111, Figs. 4 and 5, in which case the lower fluid pressure could be partial vacuum, as shown, or atmospheric pressure, which would be obtained by simply disconnecting the suction pipe from the intake manifold, the tension of the resistance springs and the area of the valve being properly proportioned to give the desired reactionary effect.

What we claim and desire to secure by Letters Patent is:—

1. Valve mechanism for controlling the operation of power actuators, comprising among its members a normally closed valve controlling passages for effecting the operation of the actuator when in open position, said valve having oppositely disposed faces of substantially the same area, one of which is exposed at all times to the higher fluid pressure in a direction to open the valve, means for exposing the other face of said valve to the lower fluid pressure when the valve is closed, an operator operated part connected with said valve for opening it, yielding resistance means normally closing said valve against the pressure of the higher fluid pressure, and being of sufficient power to offer material resistance to the movement of the valve when the fluid pressures on the opposite faces of the valve are equalized, and means for shutting off said lower fluid pressure from said valve when the valve is opened, whereby when said valve is opened, the pressure of said resistance means will be transferred to the said operator operated part in proportion to the decrease of the differential of pressures on opposite faces of the valve.

2. Valve mechanism for controlling the operation of power actuators, comprising among its members a normally closed valve controlling passages for effecting the operation of the actuator when in open position, said valve having oppositely disposed faces of substantially the same area, one of which is exposed at all times to the higher fluid pressure in a direction to open the valve, means for exposing the other face of said valve to the lower fluid pressure when the valve is closed, an operator operated part connected with said valve for opening it, yielding resistance means normally closing said valve against the pressure of the higher fluid pressure, being of sufficient power to offer material resistance to the movement of the valve when the fluid pressures on the opposite faces of the valve are equalized, and means for shutting off said lower fluid pressure from said valve when the valve is opened, and a stop engaging said valve to arrest its movement under the action of said resistance means, whereby when said valve is opened, the pressure of said resistance means will be transferred to the operator operated part in proportion to the decrease of the differential of pressures on opposite faces of the valve, and when said valve is closed the pressure of said resistance means will be transferred to said stop regardless of the fluid pressures on opposite faces of the valve.

3. Valve mechanism for controlling the operation of power actuators, comprising among its members a normally closed valve controlling passages for effecting the operation of the actuator when in open position, said valve having oppositely disposed faces of substantially the same area, one of which is exposed at all times to the higher fluid pressure in a direction to open the valve, means for exposing the other face of said valve to the lower fluid pressures when the valve is closed, an operator operated part connected with said valve for opening it, yielding resistance means normally closing said valve against the pressure of the higher fluid pressure, being of sufficient power to offer material resistance to the movement of the valve when the fluid pressures on the opposite faces of the valve are equalized and means for shutting off said lower fluid pressure from said valve when the valve is opened, a stop for limiting the closing movement of the valve under the action of said resistance means, said resistance means being interposed between the valve and a part held in fixed relation to said stop, whereby when said valve is opened, the pressure of said yielding resistance means will be transferred to the operator operated part in proportion to the decrease of the differential of pressures on opposite faces of the valve and when said valve is closed the pressure of said resistance means will be transferred to said stop regardless of the fluid pressures on opposite faces of the valve.

4. Valve mechanism for controlling the operation of power actuators comprising among its members, a normally closed valve controlling passages for admitting higher fluid pressure for effecting the operation of the actuator when in opened position, said valve having oppositely disposed faces of substantially the same area, one of which is exposed at all times to the higher pressure fluid in a direction to open the valve, means for exposing the other face of the valve to the highest pressure within the cylinder or cylinders controlled by said valve, an operator operated part connected with said valve for opening it and means for shutting off said lower fluid pressure from said valve when the valve is opened, a stop for limiting the movement of the valve in a direction to close it, yielding resistance means normally closing said valve interposed between the valve and a part in fixed relation with the said stop, and being of sufficient power to offer material resistance to the movement of the valve when the fluid pressures on opposite faces of the valve are equalized, whereby when said valve is opened, the pressure of said resistance means will be transferred to said stop when the valve is closed, regardless of the fluid pressures on opposite faces of the valve.

5. In a power actuator the combination of a cylinder and a piston therein provided with means for connecting it with a part to be operated, controlling valve mechanism, and means for connecting the cylinder with sources of higher and lower fluid pressures, under the control of said valve mechanism, said valve mechanism including among its members a valve casing communicating with the cylinder, a valve movable with respect to the valve casing, and having one face exposed at all times to the higher fluid pressure, means for normally exposing the opposite face of said valve to the lower fluid pressure when the valve is closed and cutting off the lower fluid pressure therefrom when said valve is opened, yielding resistance means for normally closing said valve against the action of the higher fluid pressure thereon, interposed between the valve and a part connected with the valve casing, an operator operated part connected with said valve for moving it in a direction to open it against the pressure of said resistance means to effect a stroke of the piston and an equalization of pressures on opposite faces of the valve, said resistance means being of sufficient power to offer material resistance to the said movement of the operator operated part when the fluid pressures on opposite faces of the valve are equalized, whereby when said valve is opened the pressure of said resistance means will be transferred to the operator operated part, in proportion to the decrease of the differential of pressures on opposite faces of the valve.

6. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder, and provided with a stop for arresting the valve in closed position, a valve movable with respect to said casing and having one face exposed at all times to the higher fluid pressure, means for normally exposing the opposite face of said valve to the lower fluid pressure when the valve is closed and cutting off the lower fluid pressure therefrom when said valve is opened, yielding resistance means for normally closing said valve against the action of the higher fluid pressure thereon interposed between the valve and a part connected with the valve casing, an operator operated part connected with the valve for moving it in a direction to open it against the pressure of said yielding means to effect a stroke of the piston and an equalization of pressures on opposite faces of the valve, said resistance means being of sufficient power to offer material resistance to the said movement of the operator operated part when the fluid pressures on opposite faces of the valve are equalized, and said valve having a sufficient area to enable the higher fluid pressure to nearly counterbalance the pressure of said yielding resistance means when the valve is closed, whereby said valve may be opened by slight pressure upon the operator operated part and when opened the pressure of said resistance means will be transferred to the operator operated part in proportion to the decrease of differential of pressures on opposite faces of the valve and when the valve is closed the pressure of said yielding means will be transferred from the operator operated part to said stop, regardless of the fluid pressures on opposite faces of the valve.

7. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder, a valve movable with respect to the valve casing and having one face exposed at all times to the higher fluid pressure, means for normally exposing the opposite face of said valve to the lower fluid pressure when the valve is closed and cutting off the lower fluid pressure therefrom when said valve is opened, yielding resistance means for normally closing said valve against the action of the higher fluid pressure thereon, interposed between the valve and a part connected with the valve casing, an operator operated part connected with said valve for moving it in a direction to open it against the pressure of said resistance means to effect a stroke of the piston, and an equalization of pressures on opposite faces of the valve, said resistance means being of sufficient power to offer material resistance to the said movement of the operator operated part when the fluid pressures on opposite faces of the valve are equalized, said valve casing being provided with a reaction surface approximately equal to the surface of the said valve, and exposed to the pressure of the higher pressure fluid in the opposite direction, to prevent the movement of the valve casing and connected parts by the higher fluid pressure on said valve when the latter is closed.

8. In a power actuator, the combination of a cylinder, a piston therein provided with means for connecting it with a part to be operated, controlling valve mechanism, and means for connecting the cylinder with sources of higher and lower fluid pressure, under the control of said valve mechanism, said valve mechanism including among its members a valve having opposite faces of substantially the same area, exposed to the higher and lower fluid pressures respectively when closed, means for cutting off the lower fluid pressure from said valve when in open position, yielding resistance means for normally closing said valve against the higher fluid pressure and interposed between the valve and a part connected with the part to be operated, the movement of the valve in a direction to open it being in the same direction as the stroke of the piston, and the movement of the part to be operated effected by the opening of the valve, an operator operated part operatively connected with said valve, said resistance means being of sufficient power to offer material resistance to the movement of the operator operated part in a direction to open the valve when the fluid pressures on opposite faces of the valve are equalized, and said valve having a sufficient area exposed to higher fluid pressure to nearly counterbalance the pressure of said resistance means, whereby the pressure of said resistance means will be transferred to the operator operated part when the valve is opened in proportion to the decrease of differential of fluid pressures on opposite faces of the valve, and whereby the physical power of the operator transmitted to said yielding resistance means will be transmitted thereby to the part to be operated.

9. Valve mechanism for controlling the operation of power actuators comprising among its members a hollow valve casing provided with an aperture for connecting it with a source of suction and with the cylinder of an actuator forward of the piston thereof, a suction valve for controlling said aperture, said casing being provided with an air inlet aperture of larger diameter than the first mentioned aperture, a normally closed air inlet valve for said inlet aperture having its outer face exposed at all times to atmospheric pressure, said casing being provided with an aperture between said valves for connecting it with the actuator cylinder in rear of the piston, a yielding resistance means normally holding said inlet valve closed against atmospheric pressure and being of sufficient power to offer material resistance to the movement of said inlet valve when the fluid pressures on the opposite faces thereof are equalized, an operator operated part, connections therefrom to said valves for effecting the opening of one after the other is closed, by a movement in either direction, and permitting the closing of both valves simultaneously, and means for normally holding the suction valve in open position.

10. Valve mechanism for controlling the operation of power actuators comprising among its members a hollow valve casing provided with an aperture for connecting it with a source of suction and with the cylinder of an actuator forward of the piston thereof, a suction valve for controlling said aperture, said casing being provided with an air inlet aperture of larger diameter than the first mentioned aperture, a normally closed air inlet valve for said inlet aperture having its outer face exposed at all times to atmospheric pressure, said casing being provided with an aperture between said valves for connecting it with the actuator cylinder in rear of the piston, a yielding resistance means normally holding said inlet valve closed against atmospheric pressure and being of sufficient power to offer material resistance to the movement of said inlet valve when the fluid pressures on the opposite faces thereof are equalized, a longitudinally movable valve actuating part extending through said valve casing and valves, and provided with means for unseating one valve after the other is closed by a movement in either direction and permitting both of the valves to be simultaneously closed, an operator operated part connected with said valve actuating part, and means for holding said valve actuating part in position to maintain the suction valve unseated when the operator operated part is in its released position.

11. The combination with a power actuator comprising a cylinder closed at both ends and a piston in said cylinder provided with means for connecting it with a part to be operated, controlling valve mechanism for said actuator comprising a valve casing operatively connected with the piston, and a part to be operated, movable longitudinally therewith, said casing being provided with an aperture for connecting it with the cylinder forward of the piston, a suction valve controlling said outlet aperture, said valve casing being provided with an air inlet aperture, of larger diameter than the suction aperture, a normally closed air inlet for said inlet aperture having its exterior face subjected at all times to atmospheric pressure, said casing being provided between said valves, with an aperture communicating with the actuator cylinder in rear of the piston, the opposite faces of said inlet valve exposed to fluid pressures being of much greater area than the corresponding faces of the suction valve, yielding resistance means interposed between the higher pressure valve and the part connected with the valve chamber having sufficient power to offer material resistance to the movement of said valve in a direction to open it, and normally holding it seated against the maximum differential of fluid pressures on its opposite faces, said yielding resistance means being nearly counterbalanced by the maximum differential of fluid pressures upon said valve when in the closed position, means for connecting the cylinder forward of the piston with a source of suction, an operator operated part, connections therefrom to said valves constructed to effect the opening of one after the other is closed by a movement in either direction, and to permit both of said valves to be closed simultaneously, and means for holding said suction valve in open position when said operator operated part is in released position.

12. The combination with a power actuator comprising a cylinder closed at both ends and a piston in said cylinder provided with means for connecting it with a part to be operated, controlling valve mechanism for said actuator comprising a valve casing operatively connected with the piston and a part to be operated and movable longitudinally therewith, said casing being provided with an aperture for connecting it with the cylinder forward of the piston, a suction valve controlling said outlet aperture, said valve casing being provided with an air inlet aperture of larger diameter than the suction aperture, a normally closed air inlet for said inlet aperture having its exterior face subjected at all times to atmospheric pressure, said casing being provided between said valves with an aperture communicating with the actuator cylinder in rear of the piston, the opposite faces of said inlet valve exposed to fluid pressures being of much greater area than the corresponding faces of the suction valve, yielding resistance means interposed between the higher pressure valve and the part connected with the valve chamber having sufficient power to offer material resistance to the movement of said valve in a direction to open it, and normally holding it seated against the maximum differential of fluid pressures on its opposite faces, said yielding resistance means being nearly counterbalanced by the maximum differential of fluid pressures upon said valve when in the closed position, means for connecting the cylinder forward of the piston with a source of suction, a valve actuating part extending through said valve casing and provided with means for effecting the opening of one of said valves after the other is closed by a movement in either direction, and to permit both of said valves to close simultaneously, an operator operated part connected with said valve actuating part, and means for holding said suction valve in open position when the operator operated part is in released position.

13. The combination with a power actuator comprising a cylinder closed at both ends and a piston in said cylinder provided with means for connecting it with a part to be operated, controlling valve mechanism for said actuator comprising a valve casing operatively connected with the piston and a part to be operated and movable longitudinally therewith, said casing being provided with an aperture for connecting it with the cylinder forward of the piston, a suction valve controlling said outlet aperture, said valve casing being provided with an air inlet aperture of larger diameter than the suction aperture, a normally closed air inlet for said inlet aperture having its exterior face subjected at all times to atmospheric pressure, said casing being provided between said valves with an aperture communicating with the actuator cylinder in rear of the piston, the opposite faces of said inlet valve exposed to fluid pressures being of much greater area than the corresponding faces of the suction valve, yielding resistance means interposed between the higher pressure valve and the part connected with the valve chamber having sufficient power to offer material resistance to the movement of said valve in a direction to open it, and normally holding it seated against the maximum differential of fluid pressures on its opposite faces, said yielding resistance means being nearly counterbalanced by the maximum differential of fluid pressures upon said valve when in the closed position, means for connecting the cylinder forward of the piston with a source of suction, a valve actuating part extending through said valve casing and provided with means for effecting the opening of one of said valves after the other is closed by a movement in either direction, and to permit both of said valves to close simultaneously, an operator operated part connected with said valve actuating part, yielding retracting means for the piston and the part to be actuated, yielding retracting means for the operator operated part, and means for arresting the operator operated part in position to hold the suction valve open when the parts are in released position.

14. In a power actuator, the combination of a cylinder, a piston therein provided with means for connecting it with a part to be operated, controlling valve mechanism, and means for connecting the cylinder with sources of higher and lower fluid pressures under the control of said valve mechanism, said valve mechanism including among its members a valve casing movable longitudinally with the part to be operated, and with respect to said cylinder, and operatively connected with the cylinder, a normally closed valve in said valve casing controlling passages for effecting a power stroke of the piston when the valve is opened, said valve having opposite faces of substantially equal area, one of which is exposed at all times to the higher fluid pressure in a direction to open the valve, means for exposing the other face of said valve to the lower fluid pressure when the valve is closed and for cutting off the lower fluid pressure therefrom when said valve is opened, an operator operated part connected with said valve for opening, yielding resistance means normally holding said valve closed against the pressure of the higher fluid pressure and being of sufficient power to offer material resistance to the movement of the valve when the fluid pressures on opposite faces of the valve are equalized, and interposed between the valve and a part connected with the part to be operated, whereby when said valve is opened the pressure of said resistance means will be transferred to the said operator operated part in proportion to the decrease of differential of pressures on opposite faces of the valves and the force exerted by the operator upon the resistance means will be transmitted to the part to be operated.

15. The combination with a power actuator comprising a cylinder, a piston therein connected with brake mechanism of the vehicle, controlling valve mechanism and means for connecting the cylinder on opposite sides of the piston with the atmosphere and with the suction passage of the engine under the control of said valve mechanism, said valve mechanism comprising a valve casing connected with the piston and movable longitudinally therewith, with respect to the cylinder, a normally closed valve in said valve casing controlling passages for effecting the operation of the piston when the valve is in open position, said valve having oppositely disposed faces of substantially the same area, one of which is exposed at all times to the atmosphere in a direction to open the valve means for exposing the other face of said valve to the lower fluid pressure when the valve is closed and for cutting off the lower fluid pressure therefrom when said valve is opened, an operator operated part connected with said valve for opening it, yielding resistance means normally holding said valve closed against the pressure of the higher fluid pressure and being of sufficient power to offer material resistance to the movement of the valve when the fluid pressures on opposite faces of the valve are equalized, and interposed between the valve and a part connected with the brake mechanism, whereby when said valve is opened, the pressure of said resistance means will be transferred to the operator operated part in proportion to the decrease of the differential of pressures on opposite faces of the valve and the force of the operator exerted upon the resistance means will be transmitted to the piston.

16. In a power actuator, the combination of a cylinder, a piston therein provided with means for connecting it with a part to be operated, controlling valve mechanism, and means for connecting the cylinder with sources of higher and lower fluid pressures under the control of said valve mechanism, said valve mechanism including among its members a valve casing provided with valve seats, a lower pressure valve for connecting the cylinder on one side of the piston with the source of lower pressure, and engaging one of said seats, yielding means for seating said valve, a higher pressure valve for connecting the said portion of said cylinder with the source of higher pressure engaging another of said seats, an operator operated part operatively connected with said valves and constructed to hold the lower pressure valve normally open, the higher pressure valve being normally seated and having opposite faces of substantially equal areas exposed to the higher and lower fluid pressures, yielding resistance means interposed between the higher pressure valve and a part connected with the valve casing for seating said valve against the higher pressure, said resistance means having sufficient power to offer material resistance to the operator operated part in a direction to open the valve when the fluid pressures thereon are equalized, but offering only slight resistance when the opposite faces of the valve are exposed to the maximum differential of fluid pressures, the movement of the operator operated part in a direction to unseat the higher pressure valve effecting the seating of the lower pressure valve, whereby when said higher pressure valve is unseated, the pressure of said yielding means therefor will be transferred to the operator through said operator operated part, in proportion to the decrease of the differential of fluid pressures on opposite faces of the said valve.

17. In a power actuator, the combination of a cylinder, a piston therein provided with means for connecting it with a part to be operated, controlling valve mechanism, and means for connecting the cylinder with sources of higher and lower fluid pressures, under the control of said valve mechanism, said valve mechanism including among its members a valve casing movable longitudinally with the part to be operated, and provided with valve seats, a lower pressure valve for connecting the cylinder on one side of the piston with the source of lower pressure and with the portion of the cylinder on the other side of the piston, and engaging one of said seats, yielding means for seating said valve, a higher pressure valve having opposite faces of much greater area than the lower pressure valve for connecting the said portion of said cylinder with the source of higher pressure engaging another of said seats, an operator operated part operatively connected with said valves and constructed to hold either of said valves open when the other is closed, yielding means connected with the operator operated part for holding the lower pressure valve normally open, the higher pressure valve having substantially equal areas of its opposite faces exposed to higher and lower fluid pressures respectively when said valve is closed, yielding resistance means interposed between the higher pressure valve and a part connected with the valve chamber for seating said valve against the higher pressure, having sufficient power to offer material resistance to the operator operated part in a direction to open said valve when the fluid pressures thereon are equalized and offering only slight resistance when the opposite faces of the valves are exposed to the maximum differential of pressures, the movement of the operator operated part in a direction to unseat the higher pressure valve effecting the seating of the lower pressure valve, whereby the pressure of the said resistance means will be transferred to the operator through said operator operated part when the higher pressure valve is unseated, in proportion to the decreasing of the differential of fluid pressures on opposite faces of said valve, and without appreciably increasing the pressure required to open said lower pressure valve to equalize pressures within the cylinder on opposite faces of the piston therein.

18. In a power actuator, the combination of a cylinder, a piston therein provided with means for connecting it with a part to be operated, a valve chamber located in the piston provided with an aperture for connecting it with a source of suction, and a suction valve for said aperture, said valve chamber being provided with an aperture of greater diameter communicating with the atmosphere, and an air inlet valve for said aperture, having one face exposed at all times to atmospheric pressure, said valve chamber being connected at all times with the cylinder on the rear side of the piston, a longitudinally movable valve actuating part extending through said valve chamber and valves, and provided with means for unseating one of said valves after the other has closed, when moved in either direction, an operator operated part connected with said valve actuating part, means for holding said valve actuating part in position to maintain the suction valve unseated when the operator operated part is in its released position, and expose the other face of the air inlet valve to the action of suction, and yielding resistance means engaging said air inlet valve in a direction to seat it, and interposed between said valve and a part rigidly connected with the piston, said resistance means being of sufficient power to overcome the atmospheric pressure on the opposite face of the inlet valve, whereby when said operator operated part is moved in a direction to seat the suction valve and open the air inlet valve, the pressure of said resistance means will be transferred to the operator operated part, in proportion to the decrease of the differential of fluid pressures on opposite faces of the said inlet valve.

19. In a power actuator, the combination of a cylinder, a piston therein provided with means for connecting it with a part to be operated, a valve chamber located in the piston provided with an aperture for connecting it with a source of suction, and a suction valve for controlling said aperture, said valve chamber being provided with an aperture of greater diameter communicating with the atmosphere, and an air inlet valve for said aperture, having one face exposed at all times to atmospheric pressure, said valve chamber being connected with the cylinder on the rear side of the piston, a longitudinally movable valve actuating part extending through said valve chamber and valves, and provided with means for unseating one of said valves after the other has closed, when moved in either direction, said means permitting both valves to close simultaneously, an operator operated part connected with said valve actuating part, means for holding said valve actuating part in position to maintain the suction valve unseated when the operator operated part is in its released position, and expose the other face of the air inlet valve to the action of suction, and yielding resistance means engaging said air inlet in a direction to seat it, and interposed between said valve and a part rigidly connected with the piston, said resistance means being of sufficient power to overcome the atmospheric pressure on the opposite face of the inlet valve, whereby when said air inlet valve is unseated the pressure of said resistance means will be transferred to the operator through said operator operated part, in proportion to the decrease of the differential of fluid pressures on opposite faces of the valve, and whereby the seating of the air inlet valve will relieve the operator operated part of the pressure of said resistance means regardless of the fluid pressures on the opposite faces of said valve.

20. In a power actuator, the combination of a cylinder, a piston therein provided with means for connecting it with a part to be operated, a valve chamber located in the piston provided with an aperture for connecting it with a source of suction, and a suction valve for controlling said aperture, said valve chamber being provided with an aperture of greater diameter communicating with the atmosphere, and an air inlet valve for said aperture, having its outer face exposed to atmospheric pressure, said valve chamber being connected with the cylinder on the rear side of the piston, a longitudinally movable valve actuating part extending through said valve chamber and valve, and provided with means for unseating one of said valves after the other has closed, when moved in either direction, an operator operated part connected with said valve actuating part, means for holding said valve actuating part in position to maintain the suction valve unseated when the operator operated part is in its released position, and expose the inner face of the air inlet valve to the action of suction, and yielding resistance means engaging said air inlet valve in a direction to seat it, and interposed between said valve and a part rigidly connected with the piston, said resistance means being of sufficient power to overcome the atmospheric pressure on the opposite face of the inlet valve, the direction of movement of the air inlet valve, to unseat it against the pressure of said resistance means, being the same as the direction of movement of the piston effected by the opening of the air inlet valve, whereby when said inlet valve is unseated the pressure of said resistance means will be transferred to the operator in proportion to the decrease of the differential of fluid pressures on opposite faces of the valve, and whereby all the force exerted by the operator in opposition to said resistance means will be transmitted to the piston in the direction of its power stroke, and to the part to be operated.

21. In a power actuator, the combination of a cylinder, a piston therein provided with means for connecting it with a part to be operated, a valve chamber located in the piston provided with an aperture for connecting it with a source of suction, and a suction valve for controlling said aperture, said valve chamber being provided with an aperture of greater diameter communicating with the atmosphere, and an air inlet valve for said aperture, having one face exposed to atmospheric pressure, said valve chamber being connected with the cylinder on the rear side of the piston, a longitudinally movable valve actuating part extending through said valve chamber and valves, and provided with means for unseating one of said valves after the other has closed, when moved in either direction, an operator operated part connected with said valve actuating part, means for holding said valve actuating part in position to maintain the suction valve unseated when the operated part is in its released position, and expose the other face of the air inlet valve to the action of suction, and yielding resistance means engaging said air inlet valve in a direction to seat it, and interposed between said valve and a part rigidly connected with the piston, said resistance means being of sufficient power to overcome the atmospheric pressure on the opposite face of the inlet valve, the direction of movement of the air inlet valve, to unseat it against the pressure of said resistance means, being the same as the direction of movement of the piston effected by the opening of the air inlet valve, whereby when said air inlet valve is unseated the pressure of said resistance means will be transferred to the operator through said operator operated part, in proportion to the decrease of the differential of fluid pressures on opposite faces of the valve, and means including a provision for lost motion for connecting the operator operated part with the piston and the part to be operated, whereby all pressure exerted on the operator operated part in opposition to said resistance means will be transmitted to the piston in the direction of its power stroke, and to the part to be operated.

22. The combination of an actuator, a cylinder and piston therein, provided with means for connecting it with a part to be operated, controlling valve mechanism for the actuator comprising a valve chamber located in the piston provided with an aperture for connecting it with the cylinder forward of the piston, and a suction valve for said aperture, said valve chamber being provided with an aperture of greater diameter communicating with the atmosphere, an air inlet valve for said aperture having one face exposed at all times to atmospheric pressure, means for connecting the portion of said valve chamber between said valves at all times with the cylinder on the rear side of the piston, means for connecting the cylinder forward of the piston with a source of suction, a longitudinally movable valve actuating part extending through said valve chamber and valves, provided with means for unseating one of said valves after the other has closed, when moved in either direction, an operator operated part connected with said valve actuating part, means for holding said actuating part in position to maintain the suction valve unseated when the operator operated part is in its released position, and expose the other face of the air inlet valve to the action of suction, and yielding resistance means engaging said air inlet valve in a direction to seat it and interposed between said valve and a part rigidly connected with the piston, said resistance means being of sufficient power to overcome the atmospheric pressure on the opposite face of the inlet valve, whereby when said operator operated part is moved in a direction to seat the suction valve and open the air inlet valve, the pressure of said resistance means will be transferred to the operator operated part in proportion to the decrease of the differential of fluid pressures on opposite faces of the said inlet valve.

23. The combination of an actuator, a cylinder and piston therein, provided with means for connecting it with a part to be actuated, a valve chamber located in the piston provided with an aperture for connecting it with the cylinder forward of the piston, and a suction valve for said aperture, said valve chamber being provided with an aperture of greater diameter communicating with the atmosphere, an air inlet valve for said aperture having one face exposed at all times to atmospheric pressure, said valve chamber being connected between said valves with the cylinder on the rear side of the piston, means for connecting the cylinder forward of the piston with a source of suction, a longitudinally movable valve actuating part extending through said valve chamber and valves, and provided with means for unseating one of said valves after the other has closed, when moved in either direction, said means permitting both valves to close simultaneously, an operator operated part connected with said valve actuating part, means for holding said actuating part in position to maintain the suction valve unseated when the operator operated part is in its released position, and expose the other face of the air inlet valve to the action of suction, and yielding resistance means engaging said air inlet valve in a direction to seat it interposed between said valve and a part rigidly connected with the piston, said resistance means being of sufficient power to overcome the atmospheric pressure on the opposite face of the inlet valve, whereby when said operator operated part is moved in a direction to seat the suction valve and open the air inlet valve the pressure of said resistance means will be transferred to the operator operated part in proportion to the decrease of the differential of fluid pressures on opposite faces of the said inlet valve, and whereby the seating of the air inlet valve will relieve the operator operated part of the pressure on said resistance means regardless of the fluid pressures on opposite faces of the valve.

24. The combination of an actuator, a cylinder and piston therein, provided with means for connecting it with a part to be actuated, a valve chamber connected and movable with the piston and provided with an aperture for connecting it with the cylinder forward of the piston, and a suction valve for said aperture, said valve chamber being provided with an aperture of greater diameter communicating with the atmosphere, an air inlet valve for said aperture having one face exposed at all times to atmospheric pressures, said valve chamber between said valve being connected at all times with the cylinder on the rear side of the piston, means for connecting the cylinder forward of the piston with a source of suction, a longitudinally movable valve actuating part extending through said valve chamber and valves, and provided with means for unseating one of said valves after the other has closed, when moved in either direction, an operator operated part connected with said valve actuating part, means for holding said actuating part in position to maintain the suction valve unseated when the operator operated part is in its released position, and expose the other face of the air inlet valve to the action of suction, and yielding resistance means engaging said air inlet valve in a direction to seat it and interposed between said valve and a part connected and movable with the piston, said resistance means being of sufficient power to overcome the atmospheric pressure on the opposite face of the inlet valve, the direction of movement of the air inlet valve to unseat it against the pressure of said resistance means being in the same direction as the direction of movement of the piston effected by the opening of the air inlet valve, whereby the force exerted by the operator in position to the resistance means will be transmitted to the piston in the direction of its power stroke and to the part to be operated, and whereby when said inlet valve is opened, the pressure of said resistance means will be transferred to the operator operated part in proportion to the decrease of the differential of fluid pressures on opposite faces of the said inlet valve.

25. The combination of an actuator, a cylinder and piston therein, provided with means for connecting it with a part to be operated, a valve chamber located in the piston provided with an aperture for connecting it with the cylinder forward of the piston, and a suction valve for said aperture, said valve chamber being provided with an aperture of greater diameter communicating with the atmosphere, an air inlet valve for said aperture having one face exposed to atmospheric pressure, said valve chamber between said valves being connected at all times with the cylinder on the rear side of the piston, means for connecting the cylinder forward of the piston with a source of suction, a longitudinally movable valve actuating part extending through said valve chamber and valves, and provided with means for unseating one of said valves after the other has closed, when moved in either direction, an operator operated part connected with said valve actuating part, means for holding said actuating part in position to maintain the suction valve unseated when the operator operated part is in its released position, and expose the other face of the air inlet valve to the action of suction, and yielding resistance means engaging said air inlet valve in a direction to seat it and interposed between said valve and a part rigidly connected with the piston, said resistance means being of sufficient power to overcome the atmospheric pressure on the opposite face of the inlet valve, the direction of movement of the air inlet valve to unseat it against the pressure of said resistance means being in the same direction as the direction of movement of the piston effected by the opening of the air inlet valve, whereby the force exerted by the operator in position to the resistance means will be transmitted to the piston in a direction of its power stroke and to the brake mechanism, and whereby when said inlet valve is opened, the pressure of said resistance means will be transferred to the operator operated part in proportion to the decrease of the differential of fluid pressures on opposite faces of the said inlet valve, and means including a provision for lost motion for connecting the operator operated part with the piston, and part to be operated.

In testimony whereof we affix our signatures.

CALEB S. BRAGG.
VICTOR W. KLIESRATH.